US012668061B2

(12) United States Patent
Lutnesky et al.

(10) Patent No.: US 12,668,061 B2
(45) Date of Patent: Jun. 30, 2026

(54) FLUIDIC STRUCTURES FOR FLUID EJECTION DEVICES

(71) Applicant: Hewlett-Packard Development Company, L.P., Spring, TX (US)

(72) Inventors: Gary G. Lutnesky, Corvallis, OR (US); Laura Wusstig, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 93 days.

(21) Appl. No.: 18/728,442

(22) PCT Filed: Feb. 4, 2022

(86) PCT No.: PCT/US2022/015209
§ 371 (c)(1),
(2) Date: Jul. 11, 2024

(87) PCT Pub. No.: WO2023/149890
PCT Pub. Date: Aug. 10, 2023

(65) Prior Publication Data

US 2025/0108619 A1 Apr. 3, 2025

(51) Int. Cl.
*B41J 2/175* (2006.01)
*B41J 2/14* (2006.01)

(52) U.S. Cl.
CPC .................. *B41J 2/175* (2013.01); *B41J 2/14* (2013.01); *B41J 2002/14362* (2013.01); *B41J 2002/14419* (2013.01)

(58) Field of Classification Search
CPC ................ B41J 2/17513; B41J 2/17523; B41J 2/17563; B41J 2/1404; B41J 2/19; B41J 2002/14403; B41J 2002/14419; B41J 2202/11; B41J 29/02; B41J 2/055; B41J 2/14145
See application file for complete search history.

(56) References Cited

U.S. PATENT DOCUMENTS 5,812,165 A 9/1998 Boyd et al.
5,909,231 A * 6/1999 Childers .................... B41J 2/19 347/85
5,917,527 A * 6/1999 Boyd .................. B41J 2/17513 347/85

(Continued)

FOREIGN PATENT DOCUMENTS

CN 1747838 A 3/2006
CN 108367568 A 8/2018

(Continued)

*Primary Examiner* — John P Zimmermann
(74) *Attorney, Agent, or Firm* — Foley & Lardner LLP

(57) ABSTRACT

In one example in accordance with the present disclosure, a fluidic structure to extend between a print fluid reservoir and a fluid ejection device is described. The structure includes a plenum with a first opening to interface with, and receive print fluid from, the reservoir. The structure also includes at least one longitudinal groove extending longitudinally between the first opening and a second opening. The structure also includes a headland surrounding the second opening. The headland is to receive the fluid ejection device for delivering print fluid to the fluid ejection device through the second opening.

20 Claims, 8 Drawing Sheets

(56) References Cited

U.S. PATENT DOCUMENTS

| | | | | |
|---|---|---|---|---|
| 6,095,639 | A * | 8/2000 | Uetsuki | B41J 2/05 347/65 |
| 6,109,734 | A * | 8/2000 | Kashino | B41J 2/055 347/92 |
| 6,749,296 | B2 * | 6/2004 | Usui | B41J 2/175 347/93 |
| 6,805,437 | B2 * | 10/2004 | Yamanaka | B41J 2/17509 347/92 |
| 9,815,290 | B2 | 11/2017 | O'Reilly et al. | |
| 9,987,852 | B2 | 6/2018 | O'Reilly et al. | |
| 2001/0035897 | A1 * | 11/2001 | Hayashi | B41J 2/17513 347/65 |
| 2002/0109762 | A1 | 8/2002 | Usui et al. | |
| 2002/0130935 | A1 | 9/2002 | Liu et al. | |
| 2003/0030709 | A1 | 2/2003 | Deshmukh et al. | |
| 2004/0056918 | A1 | 3/2004 | Wang et al. | |
| 2005/0212873 | A1 | 9/2005 | Usui et al. | |
| 2008/0043059 | A1 * | 2/2008 | Okazawa | B41J 2/17513 347/44 |
| 2009/0303299 | A1 | 12/2009 | Gilson et al. | |
| 2016/0347077 | A1 * | 12/2016 | Amma | B41J 2/17553 |
| 2020/0343153 | A1 | 10/2020 | Cumbie et al. | |
| 2021/0221029 | A1 | 7/2021 | Chen et al. | |
| 2021/0252858 | A1 | 8/2021 | Cumbie et al. | |
| 2021/0260872 | A1 | 8/2021 | Fuller et al. | |

FOREIGN PATENT DOCUMENTS

| | | | |
|---|---|---|---|
| EP | 1284194 | A2 | 2/2003 |
| EP | 1403059 | A2 | 3/2004 |
| JP | 2007-230101 | A | 9/2007 |
| JP | 2008-030333 | A | 2/2008 |
| JP | 2018-149716 | A | 9/2018 |
| WO | 2019/203780 | A1 | 10/2019 |

* cited by examiner

FLUIDIC STRUCTURES FOR FLUID EJECTION DEVICES

CROSS-REFERENCE TO RELATED APPLICATIONS

This application is a U.S. National Stage Patent Application under 35 U.S.C. § 371 of PCT/US2022/015209, filed Feb. 4, 2022, which is hereby incorporated by reference in its entirety.

BACKGROUND

Printing devices may include a fluid ejection device assembly to contain and eject a print fluid (e.g., ink) onto a substrate. In some examples, the fluid ejection device assembly may be inserted into a printing device. Some examples of printing devices include an inkjet printer. In some examples, the fluid ejection device assembly may include a cartridge or pen device. In some examples, the fluid ejection device assembly may include a single print fluid (e.g., a single color of ink) in a single print fluid reservoir. In some examples, the fluid ejection device assembly may include multiple print fluids (e.g., multiple colors of ink) contained in separate print fluid reservoirs.

Typical printhead cartridges comprise a reservoir with capillary medium to hold ink, and a standpipe and plenum downstream of the medium, to deliver the ink to a printhead die. A flexible circuit comprises contact pads at the front side of the reservoir to connect to counter pads of the printer to receive print signals. The contact pads connect to flexible traces on the flexible circuit. The flexible circuit bends around the front/bottom edge along the bottom to bond its flexible traces to fluid ejection die bond pads at the die's head surface. Encapsulation may be applied to protect the bonds at the head surface.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
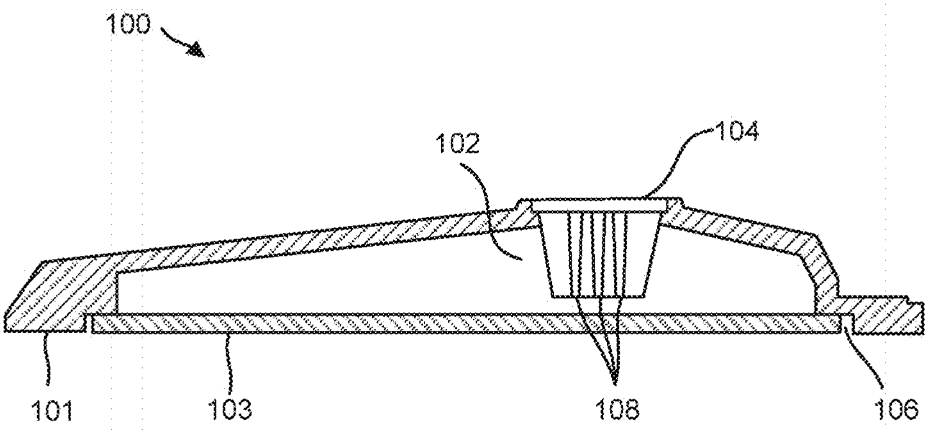
FIG. 1 illustrates a fluidic structure for a fluid ejection device in a cross-sectional side view, according to an example.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In this specification, a fluid ejection device assembly may refer to a combination of components that are assembled to form a product comprising a fluid ejection device. The fluid ejection device may consist of a fluid ejection die or may comprise a fluid ejection die, for example embedded in and/or adhered to a molded compound, like a molded board, so that the fluid ejection device comprises both the molded support and fluid ejection die. The fluid ejection device is configured to eject fluid out of at least one nozzle, for example out of a relatively high-density nozzle array having a resolution of at least 600 dots per inch. The fluid ejection device assembly be a fluid ejection cartridge, sometimes referred to as an integrated printhead cartridge. In some approaches, a fluid ejection device assembly includes a body forming a reservoir that on the shelf and before a first use contains print fluid for printing when installed in a host printer. The reservoir includes capillary medium to hold the print fluid at an appropriate backpressure. The body comprises a head surface to which the fluid ejection device is attached. Either the molded support component is attached to the head surface, or the fluid ejection die is directly attached to the head surface. The head surface may also be referred to as head surface or headland or headland surface. The fluid ejection device is to be attached to that headland. In a use orientation, the headland is formed on a lower bottom wall of the body. For example, the reservoir body may be molded from a polymer (e.g., thermoplastic resin), whereby the headland is formed during the molding of the body. In some instances, the headland includes a recess to receive the fluid ejection device.

The fluid ejection cartridges comprise a reservoir with capillary medium to hold ink. A flexible circuit comprises contact pads at the front side of the body to connect to counter pads of the printer to receive print and/or data signals to control the fluid ejection device. The contact pads connect to flexible traces on the flexible circuit. The flexible circuit bends around the front/bottom edge of the body, over the headland, to bond the flexible traces to fluid ejection die bond pads.

As such, the circuitry that is used to control the fluid ejection die may be exposed to ink during printing, or even after printing, and/or wear from servicing of the fluid ejection die. Servicing may include wiping or capping or other forms of servicing. The circuitry may corrode due to the print fluid. The circuitry may be mechanically or chemically compromised because of the servicing.

Furthermore, forming the headland to receive the fluid ejection device sometimes is accompanied by relatively complex molding requirements and relatively high manufacturing costs, for example, depending on the design, size and complexity of the reservoir body. Sometimes, there is a desire to increase the efficiency of fluid and air (e.g., bubble) routing through the fluid ejection device assembly.

The present specification describes examples of a fluidic structure for a fluid ejection device. In some examples, the fluidic structure may be formed separate from the body housing the print fluid reservoir of the fluid ejection device. In some examples, the body of the print fluid reservoir is formed in a first molding process and the fluidic structure is formed in a separate molding process. The fluidic structure may be coupled to the body via a fluidic interface (also referred to as a fluidic joint). Thus, the fluidic structure may be a component of a fluid ejection device assembly that is formed separate from the body that forms the print fluid reservoir. The fluidic structure may include a plenum and a headland. Various components (e.g., a fluid ejection device, flexible circuit, etc.) may be connected to the headland.

The present disclosure describes examples of a plenum with grooves at the fluidic interface. The fluidic interface is an interface between the plenum and the body forming the print fluid reservoir. The fluidic interface may allow for a print fluid to pass from the print fluid reservoir, into the plenum through a first opening, and then into the second opening of the headland.

In some examples, the fluidic structure may include a standpipe that is part of a plenum, which distributes print fluid to a fluid ejection device. The examples herein describe geometry for a grooved sidewall of the standpipe. In some examples, the grooved standpipe may be sized so that fluidic pathways for the print fluid are preserved even in the presence of bubbles. In some examples, bubbles may enter the opening of the headland through the nozzles of the fluid ejection device. The described examples of the grooved standpipe facilitate movement of the bubbles out of the plenum and into the print fluid reservoir, where the bubbles may be vented out of the fluid ejection device. The described examples of the grooved standpipe also facilitate preserving a fluidic pathway for print fluid to flow in the grooves in the event that bubbles become trapped in the plenum.

The described grooved standpipe examples may also reduce plastic molding sink on a wall of the headland used to attach the fluid ejection device to the headland. For example, a wall of the headland opposite the first opening of the plenum may be used as the substrate for an adhesive joint to attach the fluid ejection device to the headland. This wall may form the floor of the plenum. A second opening (e.g., a slot-shaped opening) may open in the plenum floor to allow print fluid to enter the fluid ejection device. The wall of the headland that houses the fluid ejection device may be formed within a flatness tolerance to ensure that the adhesive joint holds the fluid ejection device onto the headland. Thus, the adhesive joint is a mechanical structure that also serves as a seal for the print fluid. The described grooved standpipe may minimize molding sink to maintain the flatness of the headland at the adhesive joint. By reducing plastic molding sink and keeping flatness of the fluid ejection device surface within tolerance, the print fluid seal between the headland and the fluid ejection device may be maintained by avoiding a weak adhesive bond.

The described examples of the fluidic structure with a grooved standpipe may allow bubbles to pass in a central area of the standpipe while steering bubbles away from the joint at the fluidic interface. For example, the grooved standpipe may keep bubbles away from an adhesive flange formed between the plenum and the print fluid reservoir. This allows bubbles to pass through the fluidic interface and avoids blockage of the print fluid that may otherwise occur if bubbles are caught on the adhesive flange. In some examples, the grooves may allow print fluid to flow even in the presence of a large amount of bubbles.

In an example, the present specification describes a fluidic structure to extend between a print fluid reservoir and a fluid ejection device. The fluidic structure includes a plenum with a first opening to interface with, and receive print fluid from, the reservoir. The plenum also includes at least one longitudinal groove extending longitudinally between the first opening and a second opening. The fluidic structure also includes a headland surrounding the second opening. The headland is to receive the fluid ejection device for delivering print fluid to the fluid ejection device through the second opening.

In another example, the present specification describes a fluidic assembly with a print fluid reservoir and a fluidic structure. The structure is to extend between the reservoir and a fluid ejection device. The structure includes a plenum defined by a ramped ceiling, a floor opposite to and downstream of the ceiling, and opposite side walls along the length of the plenum between the ceiling and floor, whereby a first opening is provided in the ceiling and a second opening is provided in the floor. The structure also includes a headland surface downstream of the plenum, at the opposite side of the plenum floor wall in which the second opening extends. The headland surface is to receive the fluid ejection device for delivering print fluid received from the reservoir to the fluid ejection device through the second opening. The structure further includes a first set of grooves extending in a first of the side walls between the first opening and the second opening to form a fluidic pathway for the print fluid to flow around bubbles in the plenum.

In yet another example, the present specification describes a fluid ejection device assembly. In some examples, the fluid ejection device assembly includes a print fluid reservoir. The fluid ejection device assembly also includes a fluidic structure downstream of the reservoir. The structure includes a plenum defined by a ceiling, floor and side walls. The plenum is to receive print fluid from the reservoir through a first opening in the ceiling and is to deliver fluid to a downstream fluid ejection device through a second opening in the floor. The at least one groove is to extend between the first opening and the second opening. The structure also includes a headland at the other side of a wall that defines the floor. The assembly includes a fluid ejection device coupled to the headland. The fluid ejection device is to receive the print fluid through the second opening. The at least one groove is configured to form a fluidic pathway for the print fluid to flow around bubbles that travel from the fluid ejection device into the plenum.

In some examples, upstream of the structure is a first opening to receive print fluid from the reservoir. Downstream, a second opening extends through the floor to deliver the print fluid to the fluid ejection device. The fluid ejection device is adhered to the headland surface of the structure to receive print fluid through the second opening. The structure also includes a fluidic interface to interface with the print fluid reservoir. The fluidic interface includes a surface to connect to the reservoir with an adhesive. The structure further includes a plenum with the first opening at the fluidic interface to interface with, and receive print fluid from, the reservoir. The plenum also includes grooves extending between the first opening and the second opening. The fluid ejection device assembly also a fluid ejection device coupled to the headland. The fluid ejection device is to receive the print fluid through the second opening in the plenum floor.

Turning now to the figures, FIG. 1 illustrates an example of a fluidic structure 100 in a cross-sectional side view. The fluidic structure 100 may be a component of a fluid ejection device assembly that is formed separate from the body housing the print fluid reservoir. For example, the body may be molded separate from the fluidic structure 100. In some examples, the fluidic structure 100 may be formed from a molded compound (e.g., polymer).

In some examples, the structure 100 may be a fluidic structure to extend between a separately molded print fluid reservoir and a fluid ejection device 103. In some examples, the fluid ejection device 103 may include a fluid ejection die with number of nozzles to eject the print fluid received from the plenum 114. The fluid ejection device 103 may also include a number of electrical bond pads to receive control signals. For example, a printing device may provide control signals to the fluid ejection device 103 to control which nozzles fire. In some examples, the fluid ejection device 103 may be a silicon-based microelectromechanical systems (MEMS) device with a number of nozzles. The electrical bond pads of the fluid ejection device 103 may be aligned along the long axis of the fluid ejection device 103.

In some examples, the fluid ejection device 103 include at least one embedded fluid ejection die in a molded compound carrier. For example, the fluid ejection device 103 may be a precision overmold (POM) device with a molded component attached to a fluid ejection die. The molded component of the POM device may receive the print fluid from the fluidic structure 100 and may provide the print fluid to the fluid ejection die. In some examples, the molded component includes a fluid slot to receive the print fluid from the plenum 102. The fluid ejection die may be attached to the molded component (e.g., during over-molding of the molded component). The fluid ejection die may receive the print fluid through the fluid slot.

The fluid ejection device 103 may attach to the fluidic structure 100. In some examples, the fluidic structure 100 may be molded separately from the print fluid reservoir. In some examples, the fluidic structure 100 may be a monolithically molded object. As used herein, "monolithically molded" refers to an object that is molded as a single, discrete entity. In some examples, a monolithically molded object may be formed in a single molding process using a single molded substance. In some examples, a monolithically molded object may be formed in multiple molding processes (e.g., using a first shot mold, a second shot mold, etc.) to form a single, discrete entity.

The fluidic structure 100 includes a headland 101. In some examples, the headland 101 is a portion of the fluidic structure 100 that includes a second opening 106. The headland 101 receives the fluid ejection device 103 for delivering print fluid to the fluid ejection device 103 through the second opening 106. For example, the fluid ejection device 103 may be attached to the headland 101 with an adhesive.

In some examples, the fluidic structure 100 includes a plenum 102. The plenum 102 may receive a print fluid (e.g., from the print fluid reservoir). The plenum 102 may direct the received print fluid to the second opening 106 of the headland 101, which provides the print fluid to the fluid ejection device 103.

In some examples, the plenum 102 may include a first opening 104 to interface with, and receive print fluid from, the print fluid reservoir. For example, a print fluid from the print fluid reservoir may enter the plenum 102 of the fluidic structure 100 through the first opening 104. The first opening 104 may be located on a top surface of the fluidic structure 100 when the fluidic structure 100 is in an installed orientation in a printing device.

In some examples, the first opening 104 may have a primarily rectangular shape. In some examples, the corners of the first opening 104 may be rounded to facilitate fluid and air transfer. An example geometry of the first opening 104 is illustrated in FIG. 4. In some examples, the first opening 104 may have other shapes (e.g., circular, oval, capsule, square, etc.).

The plenum 102 may connect to the second opening 106. In some examples, the plenum 102 may be defined (e.g., formed) by a ceiling and a floor. In some examples, the plenum 102 may include a first wall and a second wall. A relatively large plenum ceiling height (e.g., as compared to the size of the fluid ejection device 103) may allow for ample print fluid flow to the fluid ejection device 103. The plenum ceiling height may also provide room for bubbles to escape the plenum 102 and exit out of the first opening 104 into the print fluid reservoir. In some examples, the plenum 102 includes opposite walls along a longitudinal direction of the plenum 102, and along a length of the second opening 106. The second opening 106 may have a longitudinal shape, whereby the grooves 108 extend on at least one of those side walls of the plenum 102 perpendicular to the second opening 106. An example of the walls of the plenum 102 as described in FIGS. 4A-4C.

Figure 2:
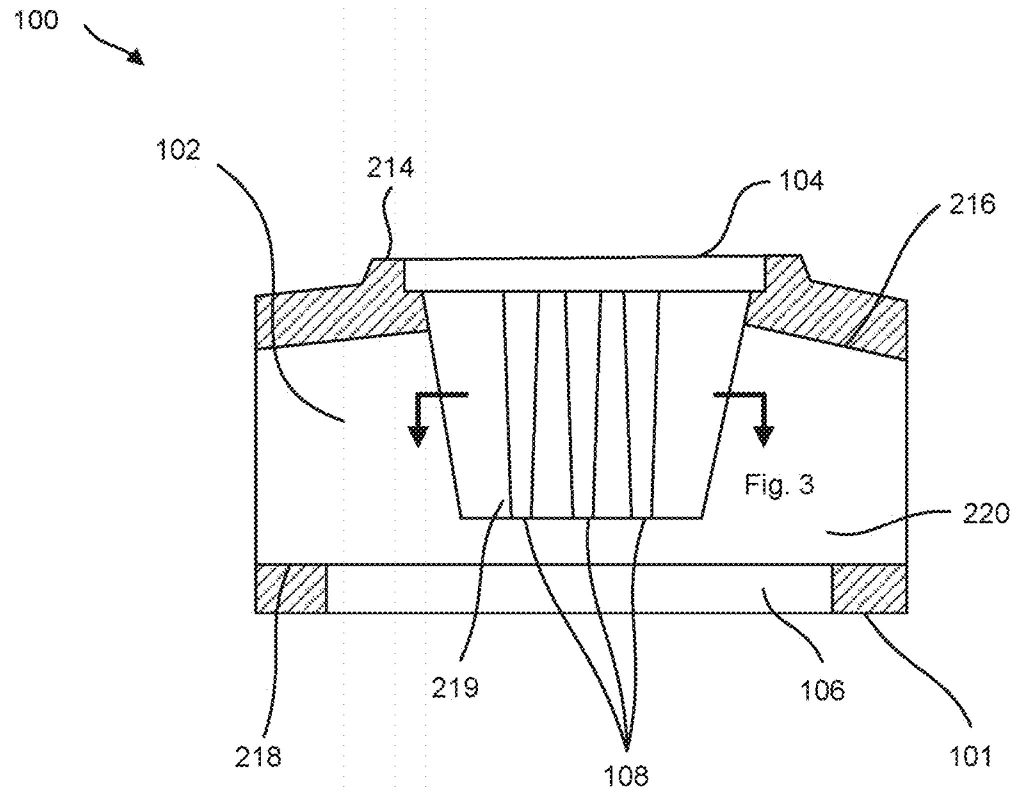
FIG. 2 illustrates the fluidic structure in a cross-sectional side view detail, according to an example.
Figure 3:
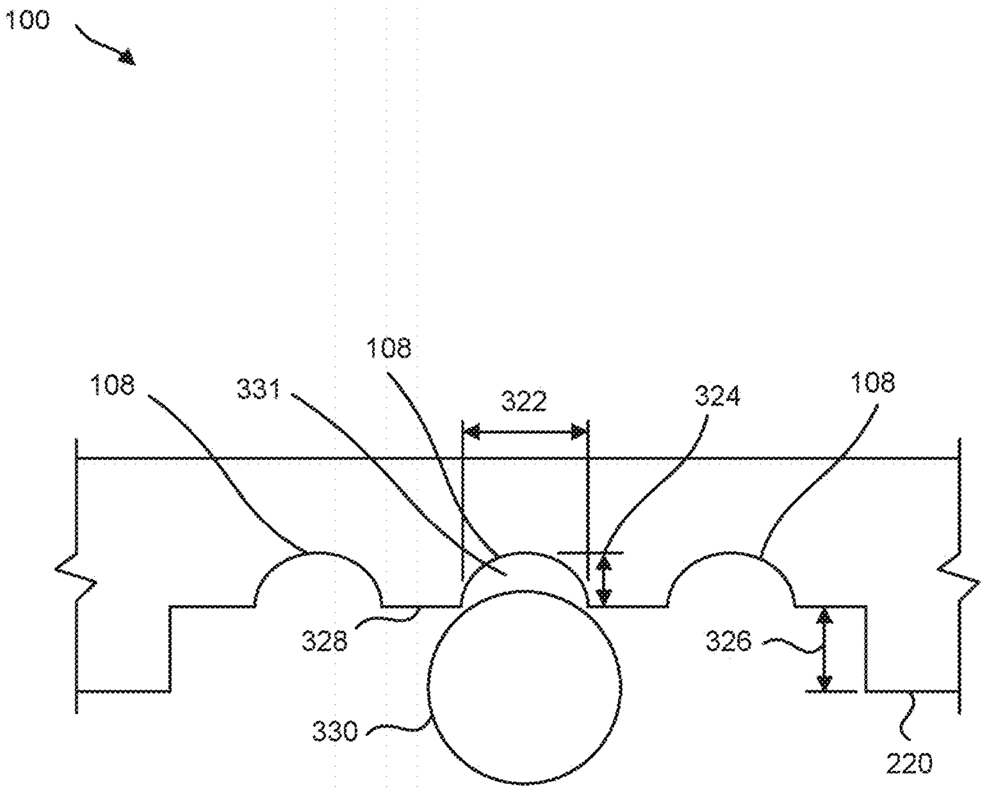
FIG. 3 illustrates grooves for the structure in a cross-sectional view, according to an example.

In some examples, the plenum 102 may include grooves 108 extending between the first opening 104 into the plenum 102. The grooves 108 may extend longitudinally between the first opening 104 and the second opening 106. In some examples, the grooves 108 of the plenum 102 may form a grooved standpipe. In some examples, the grooves 108 may be formed in a wall of the plenum 102. In some examples, the grooves 108 may extend into the wall of the plenum 102 adjacent the first opening 104. For example, the grooves 108 may start at or near the first opening 104 and may extend into the wall of the plenum 102. An example of the grooves 108 is illustrated in FIG. 2 and FIG. 3.

In some examples, the grooves 108 may include at least three grooves. In some examples, a first set of grooves 108 may be formed on a first wall of the plenum 102 and a second set of grooves 108 may be formed on a second wall of the plenum 102. In some examples, the height of the grooves 108 may be more than half of the height of the plenum 102.

In some examples, the grooves 108 may be sized to restrict bubbles in a print fluid contained within the plenum 102 from entering the grooves 108. For example, bubbles may enter the plenum 102 through nozzles in the fluid ejection device 103. If these bubbles remain within the plenum 102, the bubbles may block the flow of print fluid through the plenum 102. The grooves 108 may prevent bubbles in the print fluid from adhering to the second opening 106. The grooves 108 may form a fluidic pathway for the print fluid to pass through the first opening 104 of the plenum 102 downstream to the fluid ejection device 103. For example, the grooves 108 may be sized to prevent bubbles in the plenum 102 from entering the grooves 108 and blocking the flow of print fluid.

In some examples, the fluidic structure 100 is adhered to the reservoir using an adhesive bond. The grooves 108 may be configured to prevent bubbles in the print fluid from adhering to the adhesive bond. For example, the grooves 108 may extend into at least one side wall of the plenum 102 from a point adjacent the adhesive bond up to a point adjacent the second opening 106, to trap bubbles and form a fluidic pathway for the print fluid. The grooves 108 may position the bubbles away from the adhesive bond.

Referring now to FIG. 2, an example of the fluidic structure 100 is illustrated in a cross-sectional side view detail. FIG. 2 shows the grooves 108 extending into the plenum 102 along a side wall 220 of the plenum 102. In this example, the plenum 102 is formed by the plenum ceiling 216, the plenum floor 218, a first side wall 220, and a second wall (not shown) located opposite the first side wall 220.

In this example, the grooves 108 includes a set of three grooves 108 formed on the side wall 220. It should be noted that in other examples, the number of grooves 108 may differ based on the size of the first opening 104. For example, the set of grooves for the grooves 108 may include one groove, two grooves, three grooves, four grooves, and so forth.

In some examples, the grooves 108 may include a single set of grooves 108 formed in a single side wall 220. In some examples, the grooves 108 may include two sets of grooves 108, where a first portion of the grooves 108 includes a first set of grooves 108 formed in a first side wall 220, and a second portion of the grooves 108 includes a second set of grooves 108 formed in a second wall.

The grooves 108 may extend from the first opening 104 into the plenum 102. In some examples, the fluidic structure 100 may include a fluidic interface 214 to interface with a print fluid reservoir. In this example, the fluidic interface 214 includes a surface of the fluidic structure 100 that projects out from the first opening 104. An adhesive may be applied to the surface of the fluidic interface 214 to provide a fluid-tight connection between the fluidic structure 100 and the print fluid reservoir. Thus, the fluidic structure 100 may be adhered to the reservoir using a fluid-tight adhesive bond. The at least one groove 108 may be configured to prevent at least part of the bubbles in the print fluid from reaching or adhering to the adhesive bond.

In some examples, the plenum 102 may include a cutout (e.g., a recess) formed in the side wall 220. For example, a recessed surface may be formed in the side wall 220 during molding of the fluidic structure 100. The grooves 108 may be formed in the recessed surface of the side wall 220. The grooves 108 may extend into the side wall 220. Thus, the structure 100 may be formed by a molded compound, where the at least one groove 108 is provided in a thinner wall section of the plenum 102. The cutout and grooves 108 may reduce the wall thickness, which may limit plastic molding sink that may occur during the molding process. For example, the fluidic structure 100 may be formed by a molded compound (e.g., polymer). The grooves 108 and cutout may reduce molding sink and may maintain flatness of the plenum floor 218 by reducing a wall section thickness of the plenum 102. Molding sink may occur as the liquid molding compound cools to a solid state. A higher volume of molding compound may experience more molding sink than a lower volume of molding compound. Limiting plastic molding sink may maintain the flatness of the plenum floor 218 to which the fluid ejection device 103 attaches with an adhesive. The recess may further facilitate channeling bubbles out of the second opening 106 by increasing the volume of the plenum 102 within the area of the grooves 108.

In some examples, the grooves 108 may include a taper 219. For example, the grooves 108 may be formed with a taper 219 converging from the first opening 104 towards the second opening 106. In some examples, the recess of the grooves 108 may be formed with a taper that narrows from the first opening 104 of the grooves 108 such that the recess is narrower toward the plenum floor 218 than at the plenum ceiling 216. This taper 219 may aid in channeling bubbles out of the plenum 102 and may facilitate molding of the fluidic structure 100.

In some examples, the grooves 108 themselves may be tapered. Thus, a set of grooves 108 may be formed with a taper extending from the first opening 104 into the plenum 102. For example, a groove 108 may be larger toward the first opening 104 and may decrease in size as the groove 108 extends toward the plenum floor 218. In other examples, a groove 108 may have a uniform cross-sectional dimensions (e.g., width, depth, curvature, etc.), but the groove 108 may be angled into the plenum 102. For instance, the grooves 108 may be formed such that the grooves taper in toward the central portion of the plenum 102 as the grooves 108 extend from the first opening 104 of the grooves 108 such that the grooves 108 are wider at the first opening 104 than toward the plenum floor 218. In some examples, individual grooves may be tapered and a set of grooves may taper from the first opening 104 into the plenum 102.

FIG. 3 illustrates an example of the grooves 108 for a fluidic structure 100 in a cross-sectional view. In this example, a cross-section of the grooves 108 of FIG. 2 is illustrated. The grooves 108 may be formed within a cutout 326 (e.g., a recess) that extends into the side wall 220. For example, the side wall 220 with the grooves 108 may include a cutout 326 in the otherwise generally flush side wall 220, in which the cutout 326, the grooves 108, as well as ribs 328 between the grooves 108, are formed. The ribs 328 may include material of the side wall 220 separating the grooves 108

The grooves 108 in this example include three grooves 108 with a curved cross section. The width 322 and depth 324 may be sized to restrict a bubble 330 from fully entering the groove 108 and adhering to the wall of the groove 108. As used herein, "fully enter" refers to the ability of a bubble 330 to contact any surface of a groove 108. Thus, a groove 108 may be sized to permit a bubble 330 to contact an outer portion of the groove 108 or rib 328, but the diameter of the bubble 330 may prevent the bubble 330 from contacting an interior portion of the groove 108.

In some examples, the bubbles 330 forming from air entering the plenum 102 through the nozzles of the fluid ejection device 103 may be approximately 430 micrometers (μm) in diameter. Thus, the width 322 of the groove 108 may be sized to be less than the diameter of a bubble 330. The depth 324 of the groove 108 may be sized to restrict the bubble 330 from fully entering the groove 108 when the bubble 330 contacts the sides of the groove 108. In this manner, the bubble 330 may be kept from adhering to the side wall 220 of the fluidic structure 100 as the grooves 108 limit the surface area that a bubble 330 contacts.

In some examples, the depth 324 of the groove 108 may be made as deep as possible but not so deep as to allow an adhesive at the fluidic interface 214 to get into the groove 108. There may be tolerances that affect whether or not the adhesive gets into the groove 108. For example, the adhesive amount that is laid down (e.g., adhesive thickness) may impact groove depth 324. If more adhesive is laid down during a dispense process, then this excess amount of adhesive may be squeezed out towards the groove 108. In another example, the positioning of the surfaces of the fluidic interface 214 and the mating feature on the body of the print fluid reservoir may determine where the adhesive flows. In yet another example, the groove position and size on the headland may impact the depth of the groove 108. For example, how close the groove 108 approaches the adhesive may also contribute to whether or not the adhesive can flow into the groove and block it off.

In some examples, the groove 108 may allow print fluid to flow into the plenum 102 even in the presence of several bubbles 330 that fill the first opening to the plenum 102. Because the bubbles 330 cannot fully enter the groove 108, a fluidic pathway 331 for the print fluid to flow within the groove 108 may be preserved. Thus, if bubbles 330 block the central portion of the plenum opening, print fluid may still flow within the grooves 108. In some examples, a fluid-tight interface may be formed between the reservoir and the structure 100. The grooves 108 may form a fluidic pathway

331 for the print fluid to flow from the reservoir and around bubbles 330 in the plenum 102. The interface may include an adhesive bond.

Figure 4A:
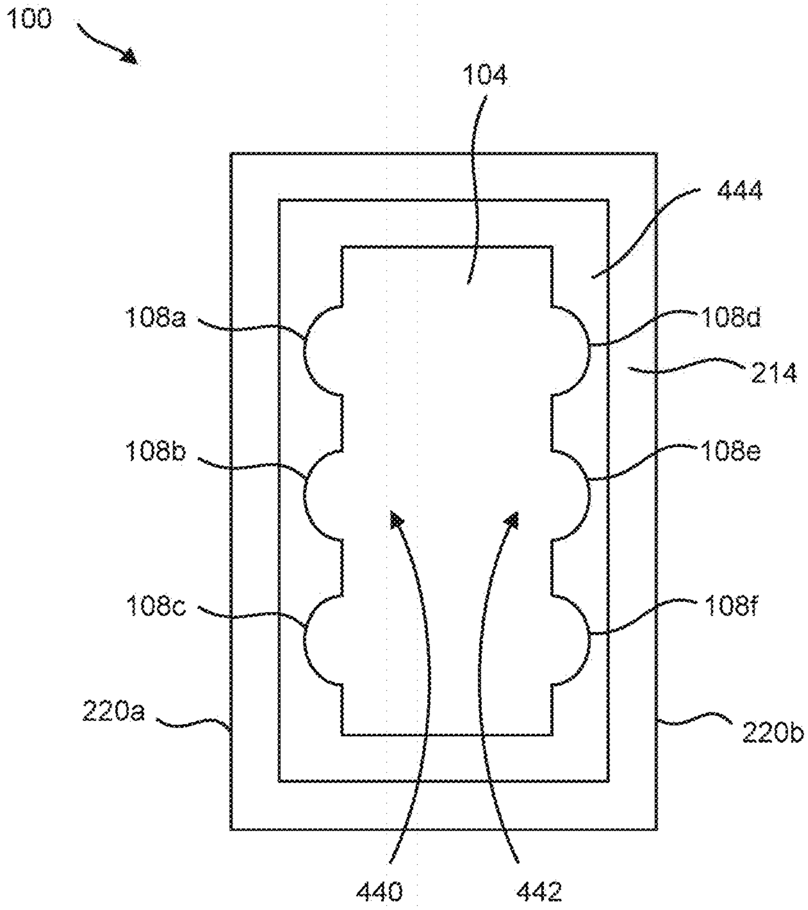
FIG. 4A illustrates a top view of a first opening into a plenum of the fluidic structure, according to an example.
Figure 4B:
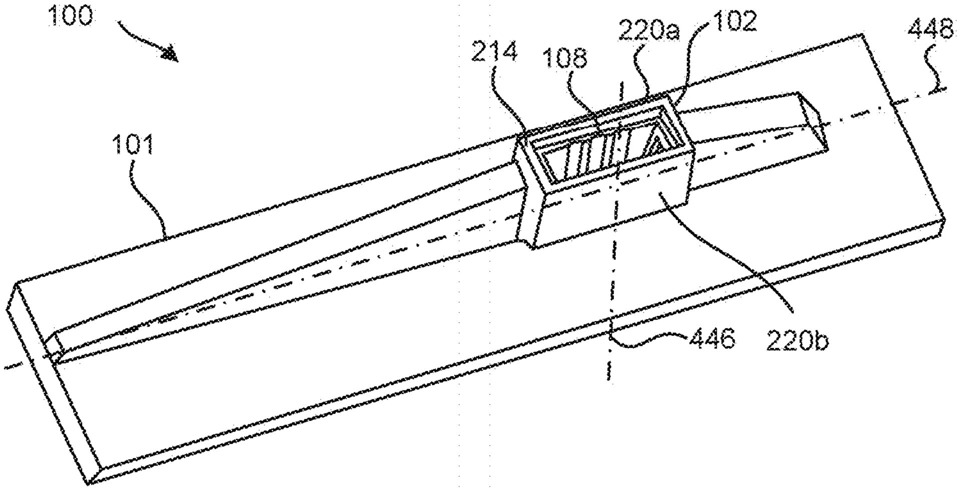
FIG. 4B illustrates a perspective view of the fluidic structure, according to an example.
Figure 4C:
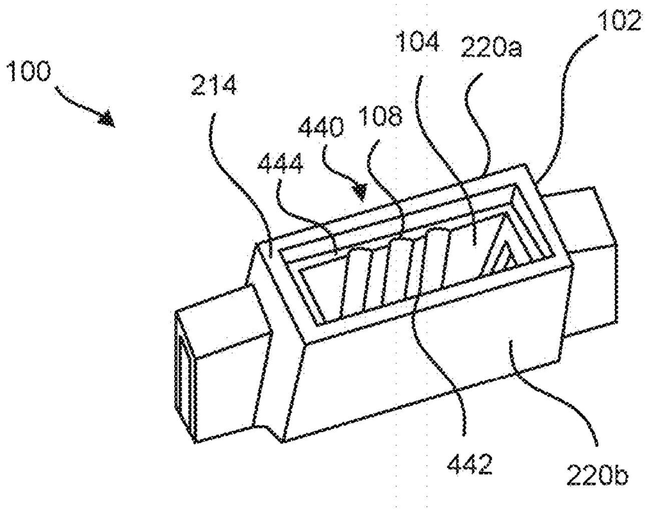
FIG. 4C illustrates a perspective view detail of the fluidic structure, according to an example.

FIGS. 4A-4C illustrate an example of the grooves 108 for a fluidic structure 100. FIG. 4A shows a top view of the first opening 104 into the plenum 102 of the fluidic structure 100. FIG. 4B illustrates a perspective view of the fluidic structure 100. FIG. 4C illustrates a perspective view detail of the fluidic structure 100.

The grooves 108 in FIGS. 4A-4C may include a first set 440 of grooves 108*a-c* located on a first side wall 220*a* and a second set 442 of grooves 108*d-f* located on the second side wall 220*b*. In some examples, the first set 440 of grooves 108*a-c* may extend on the first side wall 220*a* between the first opening 104 and into the plenum 102. The second set 442 of grooves 108*d-f* may extend on the second side wall 220*b* between the first opening 104 and into the plenum 102. In some examples, the first set 440 of grooves 108*a-c* may include a first set of grooves 108*a-c*. The second set 442 of the grooves 108 may include a second set of grooves 108*d-f*. Thus, the structure 100 may include a second, opposite, set of grooves 108*d-f* extending in a second of the side walls 220*b* between the first opening 104 and the second opening 106. In some examples, the first set 440 and the second set 442 of the grooves 108 may be implemented as described in the example of FIG. 2.

In some examples, the plenum 102 includes opposite walls 220*a*, 220*b* along a longitudinal direction 446 of the plenum 102, and along a length 448 of the second opening 106. The second opening 106 has a longitudinal shape to deliver fluid to a longitudinally shaped fluid feed hole array or fluid feed slot of the fluid ejection device 103. The grooves 108 extend on at least one of those side walls 220*a*, 220*b* of the plenum 102.

In some examples, the fluidic structure 100 includes a fluidic interface 214 to interface with a print fluid reservoir. For example, an adhesive may be applied to the fluidic interface 214 to create a fluid-tight seal connecting the fluidic structure 100 to the print fluid reservoir. The fluidic interface 214 may project a distance above the grooves 108*a-f*. In some examples, an adhesive flange may occur as the adhesive presses beyond the fluidic interface 214 and into the first opening 104. In some examples, the grooves 108*a-f* in the grooves 108 may extend from the first opening 104 at the fluidic interface 214 into the plenum 102 along the first side wall 220*a* and the second side wall 220*b*.

In this example, the fluidic interface 214 surrounds the first opening 104. The side walls of the plenum 102 may include a shelf 444 along an upstream end of at least one groove 108. The at least one groove 108 and the shelf 444 may promote movement of the print fluid around bubbles within the plenum 102 toward fluid ejection device. A shelf 444 may be formed by a surface at the end of the grooves 108*a-f*. Thus, the at least one groove 108 may terminates near the shelf 444 adjacent the first opening 104. In some examples, the shelf 444 is an edge of the cut out near the first opening 104.

The grooves 108*a-f* and the shelf 444 may promote movement of bubbles entering the plenum by reducing the surface area for the bubbles to contact and by positioning bubbles away from the adhesive flange at the fluidic interface 214. In some examples, the shelf 444 may be configured to prevent at least part of the bubbles in the print fluid from reaching or adhering to the adhesive bond. An example of a groove and shelf positioning a bubble away from the adhesive flange is illustrated in FIG. 5.

Figure 5:
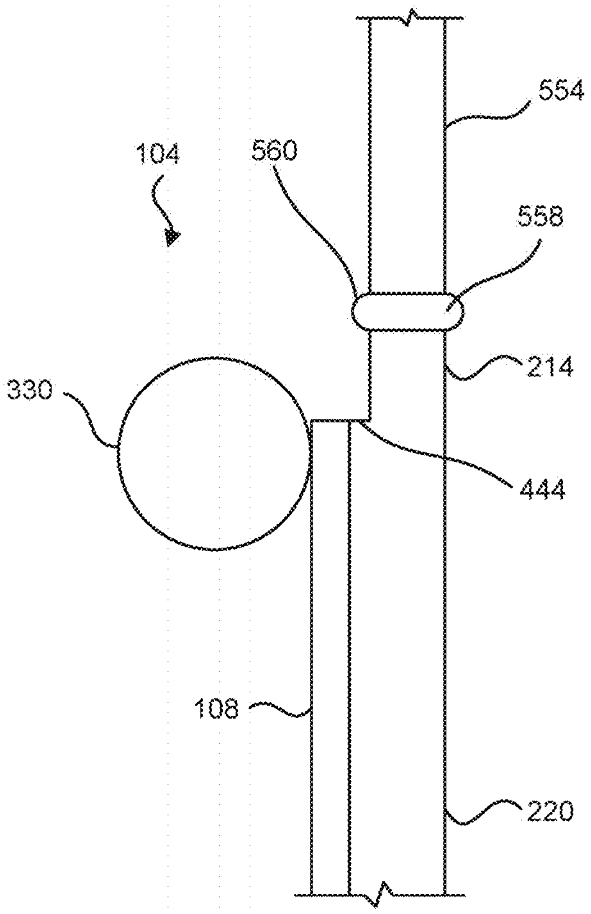
FIG. 5 illustrates a cross-sectional side view of the grooves, according to an example.

FIG. 5 illustrates a cross-sectional side view of the grooves 108. As described above, the grooves 108 may be formed in a plenum side wall 220 at a first opening 104 of the fluidic structure 100. In this example, a groove 108 is formed in the side wall 220 such that the bubble 330 cannot fully enter the groove 108.

In some examples, the grooves 108 form a shelf 444 at the first opening 104 of the plenum. The shelf 444 may be offset a distance from the fluidic interface 214 of the fluidic structure 100. In some examples, the fluidic interface 214 may connect to a print fluid reservoir 554. For example, an adhesive 558 may connect the fluidic interface 214 to the print fluid reservoir 554. An adhesive flange 560 may form as the fluidic interface 214 and the print fluid reservoir 554 are joined. The adhesive flange 560 may project into the first opening 104 of the fluidic structure 100.

The grooves 108 and the shelf 444 may position the bubbles 330 away from the adhesive 558 at the fluidic interface 214 as the bubbles 330 move out of the plenum. For example, the groove 108 and shelf 444 position the bubble 330 away from the adhesive flange 560 projecting into the first opening 104. This may restrict the bubble 330 from adhering to the adhesive flange 560 and becoming lodged in the first opening 104 of the plenum. Thus, the bubble 330 is held away from the adhesive flange 560 so the bubble 330 does not hang up on the adhesive flange 560 as the bubble 330 exits out of the fluidic structure 100 and into the print fluid reservoir 554.

Figure 6:
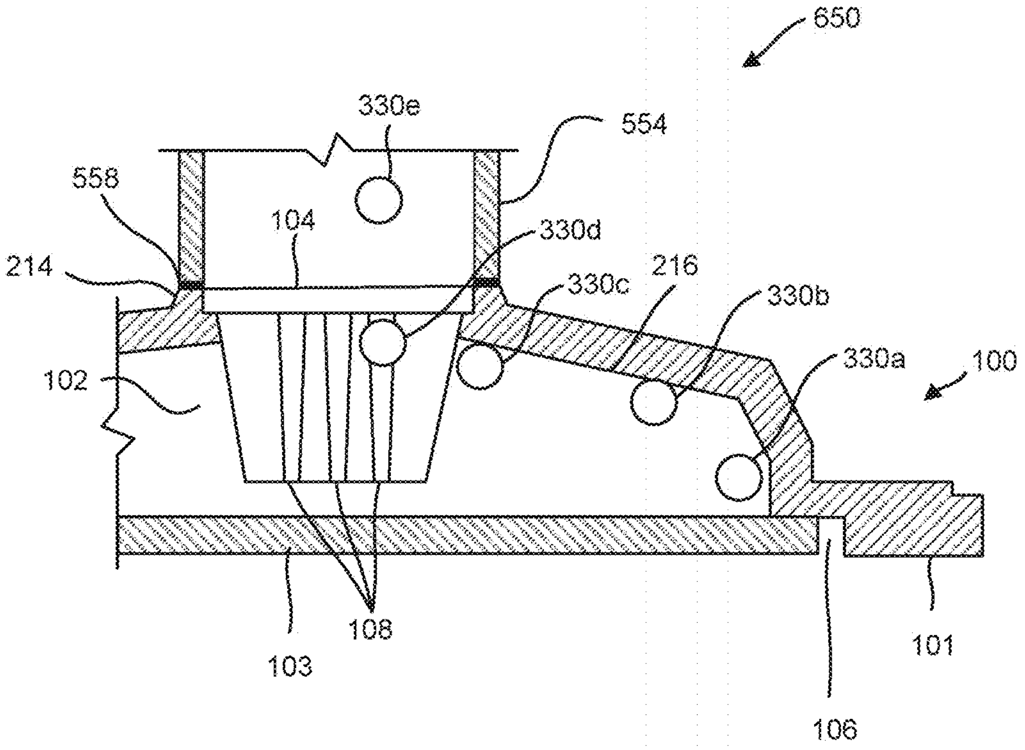
FIG. 6 illustrates an example of a fluid ejection device assembly in a cross-sectional side view.

FIG. 6 illustrates an example of a fluid ejection device assembly 650 in a cross-sectional side view. The fluid ejection device assembly 650 may include a print fluid reservoir 554, a fluidic structure 100 and a fluid ejection device 103.

In some examples, the fluidic structure 100 may include a fluidic interface 214 to interface with the print fluid reservoir 554. For example, the fluidic interface 214 may include a surface to connect to the print fluid reservoir 554 with an adhesive 558.

The fluidic structure 100 may also include a plenum 102 to transmit print fluid from the print fluid reservoir 554 to the fluid ejection device 103. In some examples, the plenum 102 may include a first opening 104 at the fluidic interface 214. The plenum 102 may include grooves 108 extending from the first opening 104 into the cavity of the plenum 102. The headland 101 may also include a second opening 106 at the plenum floor.

In some examples, the fluid ejection device 103 may be coupled to the plenum floor. For example, the fluid ejection device 103 may be attached to an exterior surface of the plenum floor with an adhesive. The fluid ejection device 103 may receive the print fluid through the second opening 106 of the headland 101.

In some examples, the fluid ejection device 103 may include a number of nozzles to eject the printing fluid received from the plenum 102. The fluid ejection device 103 may also include a number of electrical bond pads to receive control signals. For example, a printing device may provide control signals to the fluid ejection device 103 to control which nozzles fire. In some examples, the fluid ejection device 103 may be a silicon-based microelectromechanical systems (MEMS) device with a number of nozzles.

In this example, a number of bubbles 330*a-e* may enter the second opening 106 of the headland 101 through the nozzles of the fluid ejection device 103. A first bubble 330*a* is shown entering the second opening 106. Upon entering the second opening 106, the bubbles 330 may migrate from the second opening 106 to the plenum ceiling 216. In this example, bubbles 330*b* and 330*c* are shown moving along the plenum ceiling 216.

Bubble 330*d* is shown entering the grooves 108. As described above, the grooves 108 may be sized to restrict bubbles entering the second opening 106 from entering the grooves 108. The grooves 108 may keep the bubbles 330 out of the first opening 104 at the fluidic interface 214. In some examples, the grooves 108 may form a shelf at the first opening 104 of the plenum 102. The grooves 108 and the shelf may promote movement of bubbles 330 entering the second opening 106 out of the plenum 102. In this example, bubble 330*e* is shown passing out of the fluidic structure 100 and into the print fluid reservoir 554.

Figure 7:
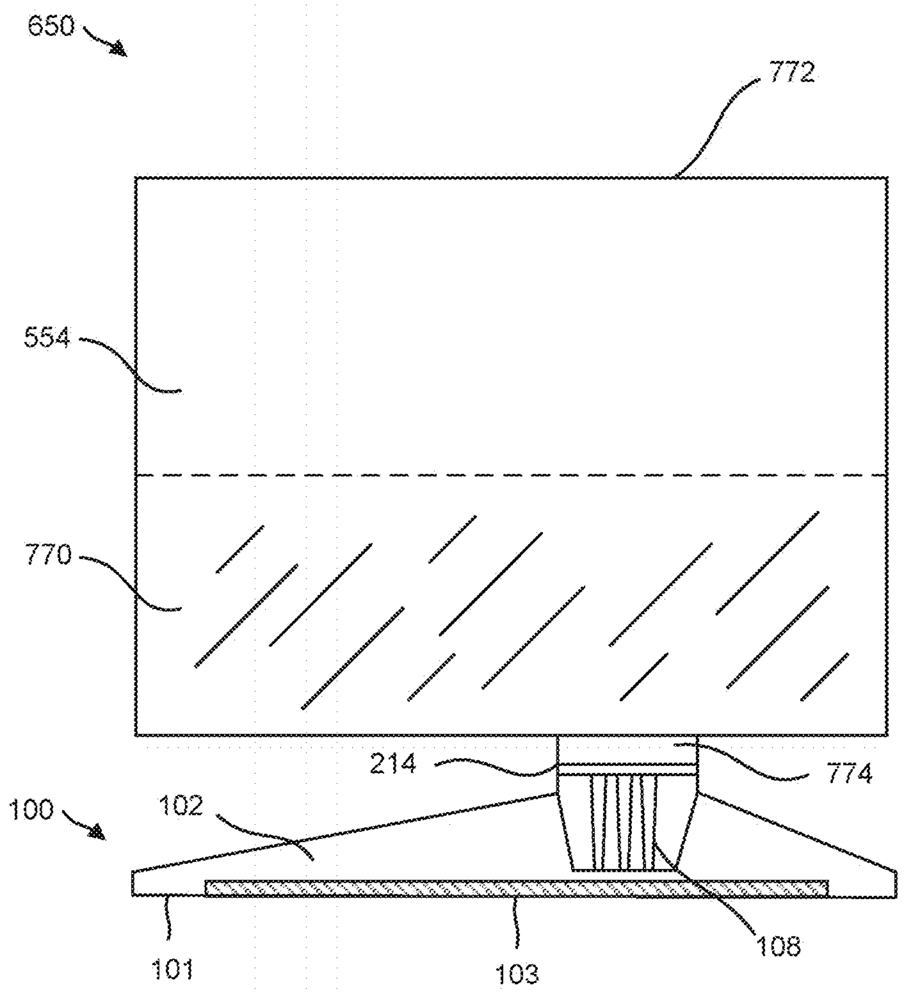
FIG. 7 illustrates another example of a fluid ejection device assembly in a cross-sectional side view.

FIG. 7 illustrates another example of a fluid ejection device assembly 650 in a cross-sectional side view. In this example, the fluid ejection device assembly 650 includes a print fluid reservoir 554 to contain a print fluid 770. The print fluid reservoir may be formed by a body 772 having a number of side walls and a bottom wall. The print fluid 770 may pass out of the print fluid reservoir 554 through an opening 774 in the body 772.

The fluid ejection device assembly 650 also includes a fluidic structure 100 downstream of the reservoir 554. The structure 100 includes a plenum 102 with a ceiling, a floor, side walls, and at least one groove 108 in at least one of the side walls. The plenum 102 is to receive the print fluid 770 from the reservoir 554 through a first opening in the ceiling and deliver fluid to a downstream fluid ejection device through a second opening in the floor, the at least one groove extending between the first opening and the second opening.

The fluidic structure 100 also includes a headland 101 at the other side of a wall that defines the floor of the plenum 102. A fluid ejection device 103 may be coupled to the headland 101. The fluid ejection device 103 is to receive the print fluid 770 through the second opening. The at least one groove 108 is configured to form a fluidic pathway for the print fluid to flow around bubbles that travel from the fluid ejection device 103 into the plenum 102.

In some examples, the fluidic structure 100 is molded separately from the reservoir 554. For example, the body 772 may be formed in a first molding process and the fluidic structure 100 may be separately formed in a second molding process.

The assembly 650 may include a fluidic interface 214 between the print fluid reservoir 554 and the fluidic structure 100. The interface 214 may include at least one physical interruption and at least one groove 108 is designed and positioned to keep bubbles away from the at least one interruption. In some examples, a shelf 444 is provided along at least a part of the interface 214 to keep bubbles away from the at least one interruption. In some examples, the fluidic interface 214 includes an adhesive bond and the physical interruptions comprise flanges in the adhesive bond.

What is claimed is:

1. A fluidic structure to extend between a print fluid reservoir and a fluid ejection device, the structure comprising:

a plenum comprising:

a first opening to interface with, and receive print fluid from, the reservoir; and at least one longitudinal groove extending longitudinally between the first opening and a second opening wherein the at least one longitudinal groove has a width of less than 430 micrometers; and a headland comprising the second opening, the headland to receive the fluid ejection device for delivering print fluid to the fluid ejection device through the second opening.

2. The structure of claim 1, wherein the at least one groove comprises at least three grooves.

3. The structure of claim 1, wherein the at least one groove is configured to form a fluidic pathway for the print fluid to flow around bubbles in the plenum through the first opening.

4. The structure of claim 1, wherein the at least one groove extends into at least one side wall of the plenum from a point adjacent an adhesive bond up to a point adjacent the second opening.

5. The structure of claim 1, wherein a height of the at least one groove is more than half of a height of the plenum.

6. The structure of claim 1, wherein the at least one groove terminates near a shelf adjacent the first opening.

7. The structure of claim 4, wherein the plenum comprises opposite walls along a length of the second opening, the second opening having a longitudinal shape to deliver fluid to a longitudinally shaped fluid feed hole array or fluid feed slot of the fluid ejection device, whereby the at least one groove extends in at least one of those side walls of the plenum.

8. The structure of claim 7, comprising a plurality of grooves, wherein the side wall with the grooves comprises a cutout in an otherwise generally flush side wall, whereby the grooves, and ribs between the grooves, extend within the cutout, and the shelf is an edge of the cutout near the first opening.

9. The structure of claim 1, wherein the fluidic structure is molded separately from the print fluid reservoir.

10. An assembly comprising the structure of claim 6 and the print fluid reservoir, wherein the structure is adhered to the reservoir adjacent said first opening at an interface between the structure and reservoir using a fluid-tight adhesive bond, and the shelf extends along a part of the interface, the shelf being configured to prevent at least part of the bubbles in the print fluid from reaching or adhering to the adhesive bond.

11. A fluidic assembly comprising a print fluid reservoir and a fluidic structure, the structure to extend between the reservoir and a fluid ejection device, the structure comprising:

a plenum defined by a ramped ceiling, a floor opposite to and downstream of the ceiling, and opposite side walls along the length of the plenum between the ceiling and floor, whereby a first opening is provided in the ceiling and a second opening is provided in the floor, and a headland surface downstream of the plenum, at the opposite side of the plenum floor in which the second opening extends, the headland surface to receive the fluid ejection device for delivering print fluid received from the reservoir to the fluid ejection device through the second opening;

the structure further comprising a first set of grooves extending in a first of the side walls between the first opening and the second opening to form a fluidic pathway for the print fluid to flow around bubbles in the plenum, wherein the grooves have a width of less than 430 micrometers.

12. The assembly of claim 11 wherein the structure comprising a second, opposite, set of grooves extending in a second of the side walls between the first opening and the second opening.

13. The assembly of claim 11 further comprising a fluid-tight interface between the reservoir and the structure, the grooves to form a fluidic pathway for the print fluid to flow around bubbles in the plenum.

14. The assembly of claim 13 wherein the interface comprises an adhesive bond.

15. A fluid ejection device assembly, comprising:

a print fluid reservoir;

a fluidic structure downstream of the reservoir, the structure comprising:

a plenum comprising a ceiling, a floor, side walls, and at least one groove in at least one of the side walls, the plenum to receive print fluid from the reservoir through a first opening in the ceiling and deliver fluid to a downstream fluid ejection device through a second opening in the floor, the at least one groove extending between the first opening and the second opening, and a headland at the other side of a wall that defines the floor; and a fluid ejection device coupled to the headland, the fluid ejection device to receive the print fluid through the second opening; wherein the at least one groove is configured to form a fluidic pathway for the print fluid to flow around bubbles that travel from the fluid ejection device into the plenum, and wherein the at least one groove has a width of less than 430 micrometers.

16. The fluid ejection device assembly of claim 15, wherein the fluidic structure is molded separately from the reservoir, the assembly comprising a fluidic interface between the print fluid reservoir and the fluidic structure, wherein the interface comprises at least one physical interruption and a shelf is provided along at least a part of the interface to keep bubbles away from the at least one interruption.

17. The fluid ejection device assembly of claim 16, wherein the fluidic interface comprises an adhesive bond and the at least one interruption comprises a flange in the adhesive bond.

18. The fluid ejection device assembly of claim 15, wherein the side walls of the plenum comprise a shelf along an upstream end of the at least one groove, wherein the at least one groove and the shelf are to promote movement of the print fluid around bubbles within the plenum toward fluid ejection device.

19. The assembly of claim 15, wherein the structure is formed by a molded compound, wherein the at least one groove is provided in a thinner wall section of the plenum.

20. The assembly of claim 15, wherein the fluid ejection device comprises at least one embedded fluid ejection die in a molded compound carrier.

* * * * *